United States Patent
Watson (10) Patent No.: US 7,626,309 B2
(45) Date of Patent: Dec. 1, 2009

(54) METHOD OF BALANCING AN EMBEDDED PERMANENT MAGNET MOTOR ROTOR

(75) Inventor: Andrew P. Watson, Export, PA (US)

(73) Assignee: Canopy Technologies, LLC, Jeannette, PA (US)

( * ) Notice: Subject to any disclaimer, the term of this patent is extended or adjusted under 35 U.S.C. 154(b) by 321 days.

(21) Appl. No.: 11/854,208

(22) Filed: Sep. 12, 2007

(65) Prior Publication Data

US 2009/0066174 A1 Mar. 12, 2009

(51) Int. Cl.
    *H02K 15/16* (2006.01)
(52) U.S. Cl. ............. 310/261; 310/156.08; 310/156.49; 310/51; 29/598; 29/901
(58) Field of Classification Search .................... 310/51, 310/156.55, 261, 273, 156.48–156.49, 156.56, 310/156.08; 29/598, 901
    See application file for complete search history.

(56) References Cited

U.S. PATENT DOCUMENTS

| | | | |
|---|---|---|---|
| 4,725,750 A | 2/1988 | Welch | |
| 4,742,259 A | 5/1988 | Schaefer et al. | |
| 4,933,583 A * | 6/1990 | Ripplinger | 310/156.22 |
| 4,954,736 A | 9/1990 | Kawamoto et al. | |
| 5,811,908 A | 9/1998 | Iwata et al. | |
| 6,005,318 A | 12/1999 | Pop, Sr. | |
| 6,047,460 A | 4/2000 | Nagate et al. | |
| 6,049,153 A | 4/2000 | Nishiyama et al. | |
| 6,078,121 A | 6/2000 | Poag et al. | |
| 6,147,428 A | 11/2000 | Takezawa et al. | |
| 6,255,754 B1 | 7/2001 | Savage et al. | |
| 6,259,180 B1 | 7/2001 | Pop, Sr. | |
| 6,356,001 B1 | 3/2002 | Nishiyama et al. | |
| 6,369,480 B1 | 4/2002 | Nishiyama et al. | |
| 6,700,288 B2 * | 3/2004 | Smith | 310/216.023 |
| 6,727,626 B2 | 4/2004 | Horng et al. | |
| 6,759,778 B2 | 7/2004 | Nishiyama et al. | |
| 6,799,362 B2 | 10/2004 | Murakami et al. | |
| 6,860,724 B2 | 3/2005 | Cho et al. | |
| 6,917,137 B2 * | 7/2005 | Okamoto et al. | 310/261.1 |
| 6,933,645 B1 * | 8/2005 | Watson | 310/156.09 |
| 6,979,924 B2 | 12/2005 | Nishiyama et al. | |
| 7,102,264 B2 | 9/2006 | Yanashima et al. | |
| 7,531,934 B2 * | 5/2009 | Hang et al. | 310/156.56 |
| 2002/0175584 A1 | 11/2002 | Koharagi et al. | |
| 2003/0197435 A1 | 10/2003 | Horng et al. | |
| 2007/0090701 A1 | 4/2007 | Down et al. | |
| 2009/0139079 A1 * | 6/2009 | Shibui et al. | 29/598 |

FOREIGN PATENT DOCUMENTS

| | | |
|---|---|---|
| EP | 0168055 A2 | 1/1986 |
| EP | 0905866 A2 | 3/1999 |
| EP | 1355407 A1 | 10/2003 |
| FR | 1280370 A | 12/1961 |

(Continued)

*Primary Examiner*—Burton Mullins
(74) *Attorney, Agent, or Firm*—The Webb Law Firm (57) ABSTRACT

A method of balancing an embedded permanent magnet motor rotor includes the steps of: a) providing a non-magnetic cylindrical shaft having an axis of rotation and a generally cylindrical surface with an even number of recessed slots defining an even number of ribs therebetween; b) machining an axial slot having a cross-section with a top opening, a bottom and two sides in a center portion of each of the recessed slots; c) sliding at least one balance weight into at least one of the axial slots; and d) inserting locating rods into the axial slot on each side of the at least one balance weight.

20 Claims, 5 Drawing Sheets

FOREIGN PATENT DOCUMENTS

| | | |
|---|---|---|
| JP | 09149570 A | 6/1997 |
| JP | 2000-125491 | 4/2000 |
| JP | 2000321162 A | 11/2000 |
| JP | 2002-010588 A | 1/2002 |
| JP | 2005-160153 | 6/2005 |

\* cited by examiner

METHOD OF BALANCING AN EMBEDDED PERMANENT MAGNET MOTOR ROTOR

BACKGROUND OF THE INVENTION

1. Field of the Invention

The present invention relates to a rotary electric device and, more particularly, to a method of balancing an embedded permanent magnet rotor in a permanent magnet type rotary electric device.

2. Description of Related Art

Figure 1:
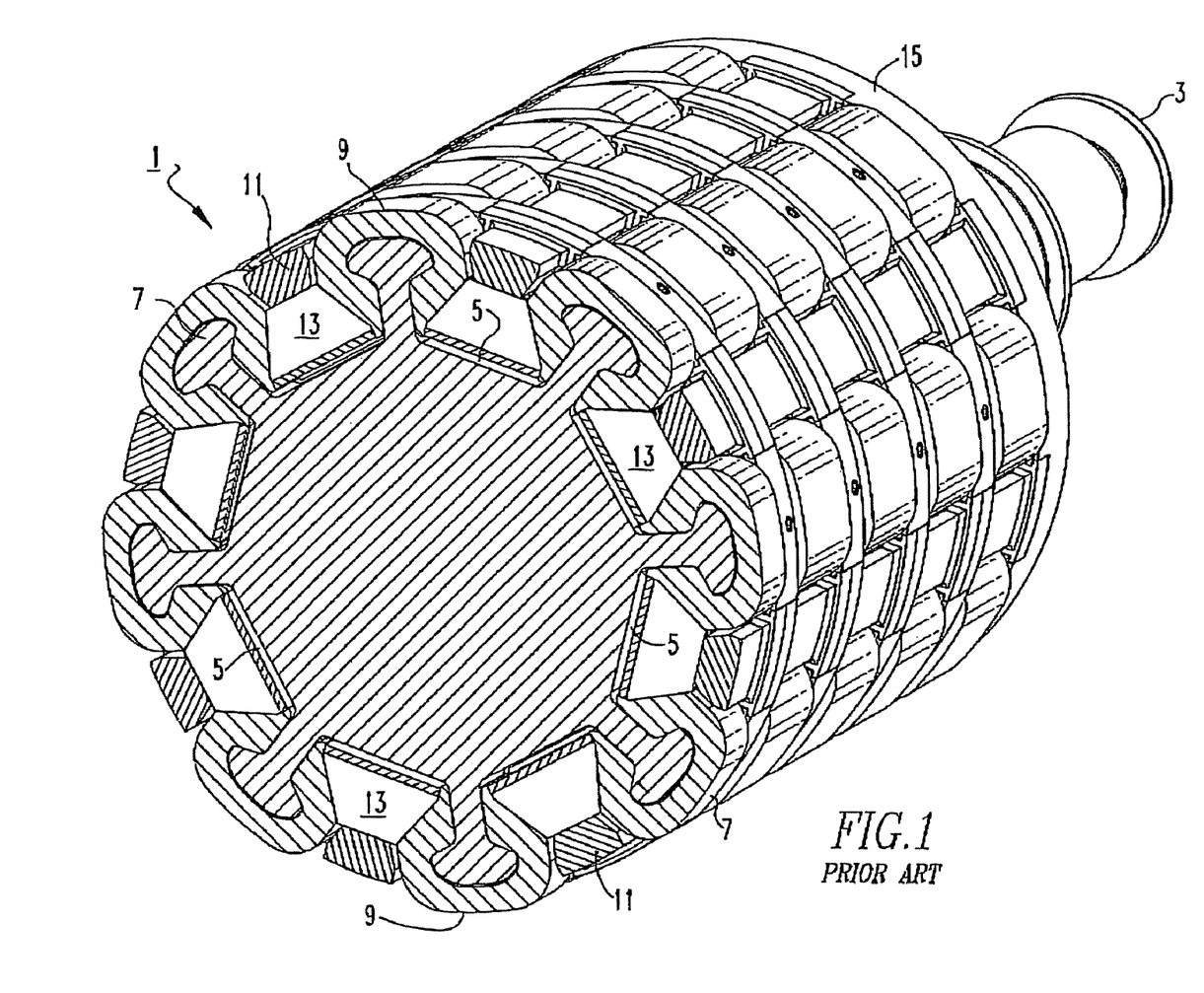
FIG. 1 is a perspective view of a conventional, assembled permanent magnet rotor sectioned by a plane perpendicular to the axis of the rotor.

Machines powered by electric motors often use permanent magnet rotor assemblies. With reference to FIG. 1, a typical rotor assembly 1 includes a shaft 3 with an even number of substantially identical recessed and overhung slots 5. Slots 5 define substantially identical generally T-shaped ribs 7 with dovetail surfaces adjacent slots 5. A plurality of generally C-shaped lamination stacks 9 surrounds T-shaped ribs 7. Stacks 9 are made up of individual sheets positioned perpendicular to the axis of rotation of shaft 3. The sheets have edges that abut the overhung or dovetail surface of ribs 7. A plurality of non-magnetic cradles 11 for holding permanent magnets 13 is positioned in each slot 5. Each cradle 11 carries laminated permanent magnets 13. Retainer plates 15 enclose permanent magnets 13, lamination stacks 9 and cradles 11. This embedded permanent magnet rotor is designed to axially assemble magnets 13 in their respective cradles 11 as tightly packed as possible to maximize the power per unit of axial length of rotor 1. However, this configuration does not allow access to the center of rotor 1 for a mid-plane balance correction.

Since current permanent magnet rotor assemblies, such as the one described above, are typically run above their first critical speed, it is essential that a mid-plane balance area be available for balancing the rotor. However, this design does not provide such a mid-plane balance area. Instead, the current process is to balance the shaft at full speed using an end planes and mid-span material removal method of balancing. This method is performed by weighing the parts of the rotor that are to be assembled and then calculating the location of each part to give minimum residual unbalance. Such a method is usually sufficient for an initial balancing of the rotor; however, if a factor changes the balance during use, such as bearing area or shaft end repair, it is very difficult, if not impossible, to rebalance the rotor without disassembling the rotor to make a mid-plane balance correction. Accordingly, the current method to make a mid-plane balance correction after initial assembly is to disassemble permanent magnets 13, lamination stacks 9 and cradles 11 from shaft 3, make the mid-plane balance correction and reassemble permanent magnets 13, lamination stacks 9 and cradles 11 to shaft 3. Such a process is time consuming and costly and creates a safety risk in handling magnet 13 since such magnets 13 are extremely powerful.

Accordingly, a need exists for a method of balancing an embedded permanent magnet rotor that allows for a mid-plane balance correction of the rotor without disassembling the rotor.

SUMMARY OF THE INVENTION

The present invention allows for quick and easy mid-plane balance correction of an assembled embedded permanent magnet rotor without disassembling the rotor. The present invention is, therefore, directed to a method of balancing an embedded permanent magnet motor rotor. The method includes the steps of: a) providing a non-magnetic cylindrical shaft having an axis of rotation and a generally cylindrical surface with an even number of recessed slots defining an even number of ribs therebetween; b) machining an axial slot having a cross-section with a top opening, a bottom and two sides in a center portion of each of the recessed slots; c) sliding at least one balance weight into at least one of the axial slots; and d) inserting locating rods into the axial slot on each side of the at least one balance weight.

After step b) and prior to step c), a plurality of stages of lamination stacks and magnets may be positioned around the shaft and two retainer plates with holes machined therein corresponding to a position of each of the axial slots may be positioned at a first end and a second end of the shaft, respectively, to secure the plurality of stages therebetween. Each stage may include a plurality of lamination stacks surrounding the ribs, and a plurality of permanent magnets circumferentially positioned between the lamination stacks. The locating rods may have a length such that the locating rods fill an axial length between the balance weight and each of the retainer plates.

The top opening of the axial slot may have a width that is smaller than a width of the bottom of the axial slot. The axial slot may have a substantially trapezoidal cross-section. The at least one balance weight may also have a substantially trapezoidal cross-section. The balance weight may be constructed from a heavy, non-magnetic material. The locating rods may have a substantially round cross-section. The locating rods may be constructed from a light-weight, non-magnetic material.

The present invention is also directed to a permanent magnet rotor assembly. The assembly includes a non-magnetic cylindrical shaft having an axis of rotation and a generally cylindrical surface with an even number of recessed slots defining an even number of ribs therebetween. Each of the recessed slots has an axial slot positioned in a center portion thereof and extending along a length thereof. The assembly also includes a plurality of stages of lamination stacks and magnets surrounding the shaft to form an assembly. Each stage includes a plurality of lamination stacks surrounding the ribs, and a plurality of permanent magnets circumferentially positioned between the lamination stacks. At least one balance weight is positioned within each of the axial slots. Locating rods are positioned in the axial slot on each side of the at least one balance weight. Disc-shaped retainer plates with holes machined therein corresponding to each of the axial slots are provided at each axial end of the rotor.

The top opening of the axial slot may have a width that is smaller than a width of the bottom of the axial slot. The axial slot may have a substantially trapezoidal cross-section. The at least one balance weight may also have a substantially trapezoidal cross-section. The balance weight may be constructed from a heavy, non-magnetic material. The locating rods may have a substantially round cross-section and may be constructed from a light-weight, non-magnetic material. The locating rods may also have a length such that the locating rods fill an axial length between the balance weight and each of the retainer plates.

The lamination stacks may be generally C-shaped, and the retainer plates may be constructed of a high strength, light-weight, non-magnetic material.

The present invention is additionally a method of balancing an embedded permanent magnet motor rotor. The method includes the steps of: a) providing a non-magnetic cylindrical shaft having an axis of rotation and a generally cylindrical surface with an even number of recessed slots defining an even number of ribs therebetween; b) machining an axial slot having a cross-section with a top opening, a bottom and two sides in a center portion of each of the recessed slots; c) positioning a plurality of stages of lamination stacks and magnets around the shaft; d) positioning two retainer plates with holes machined therein corresponding to a position of each of the axial slots at a first end and a second end of the shaft, respectively, to secure the plurality of stages therebetween; e) sliding at least one balance weight into at least one of the holes of one of the retainer plates and then into one of the axial slots; and f) inserting locating rods into the axial slot on each side of the at least one balance weight. Each of the plurality of stages includes: a plurality of lamination stacks surrounding the ribs, and a plurality of permanent magnets circumferentially positioned between the lamination stacks.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PRESENT INVENTION

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention.

Figure 2:
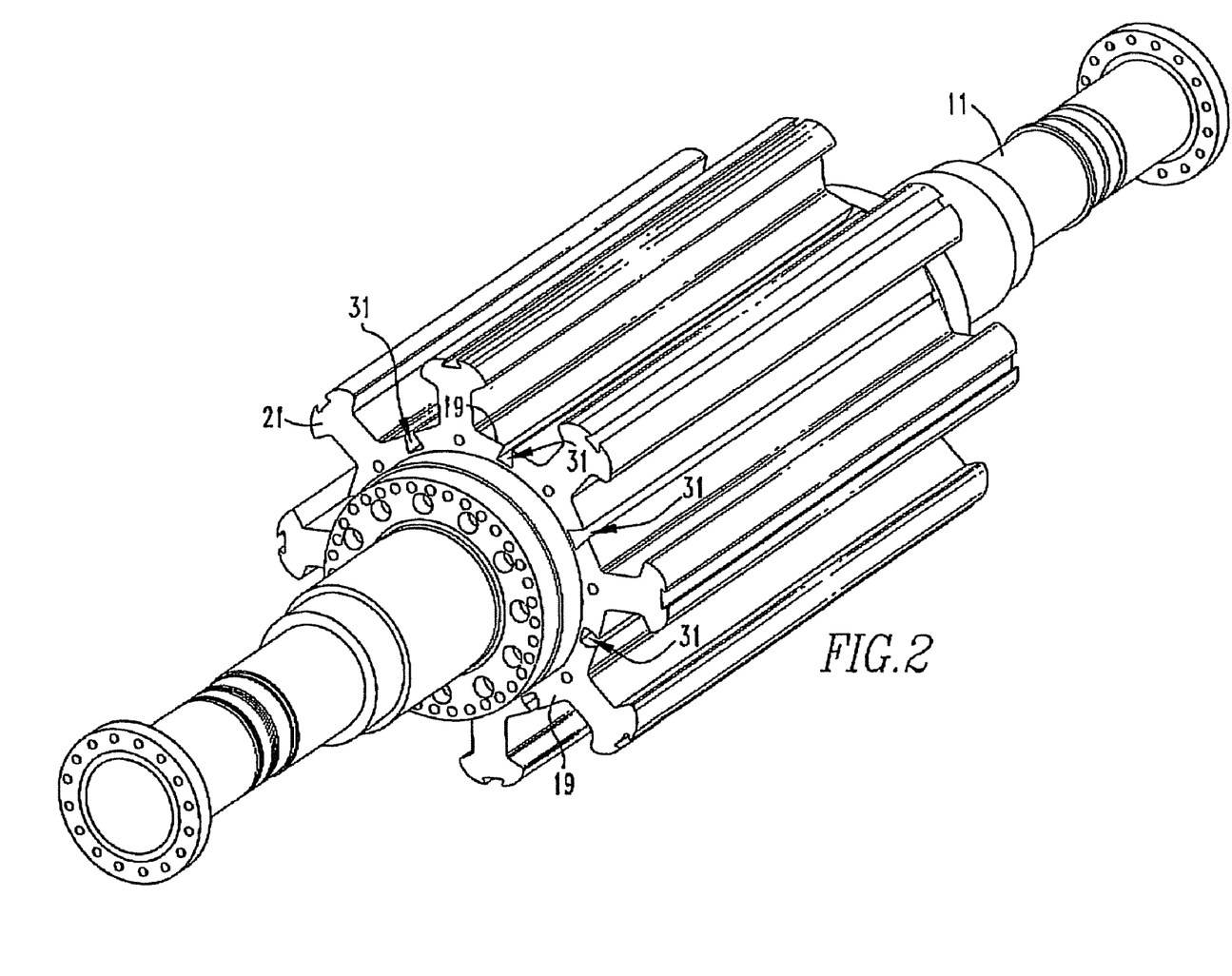
FIG. 2 is a perspective view of a shaft of a permanent magnet rotor in accordance with the present invention.
Figure 3:
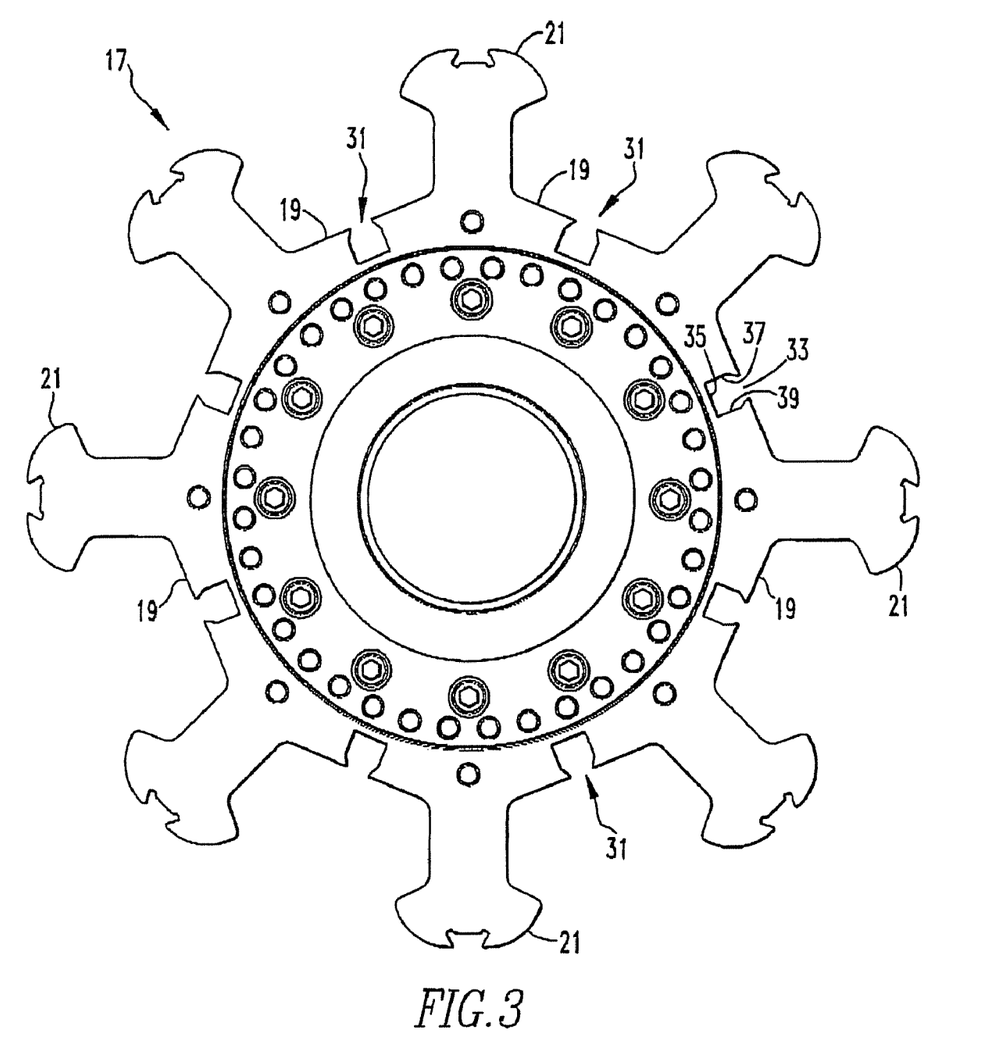
FIG. 3 is a section view of the shaft of the permanent magnet rotor of FIG. 2.
Figure 4:
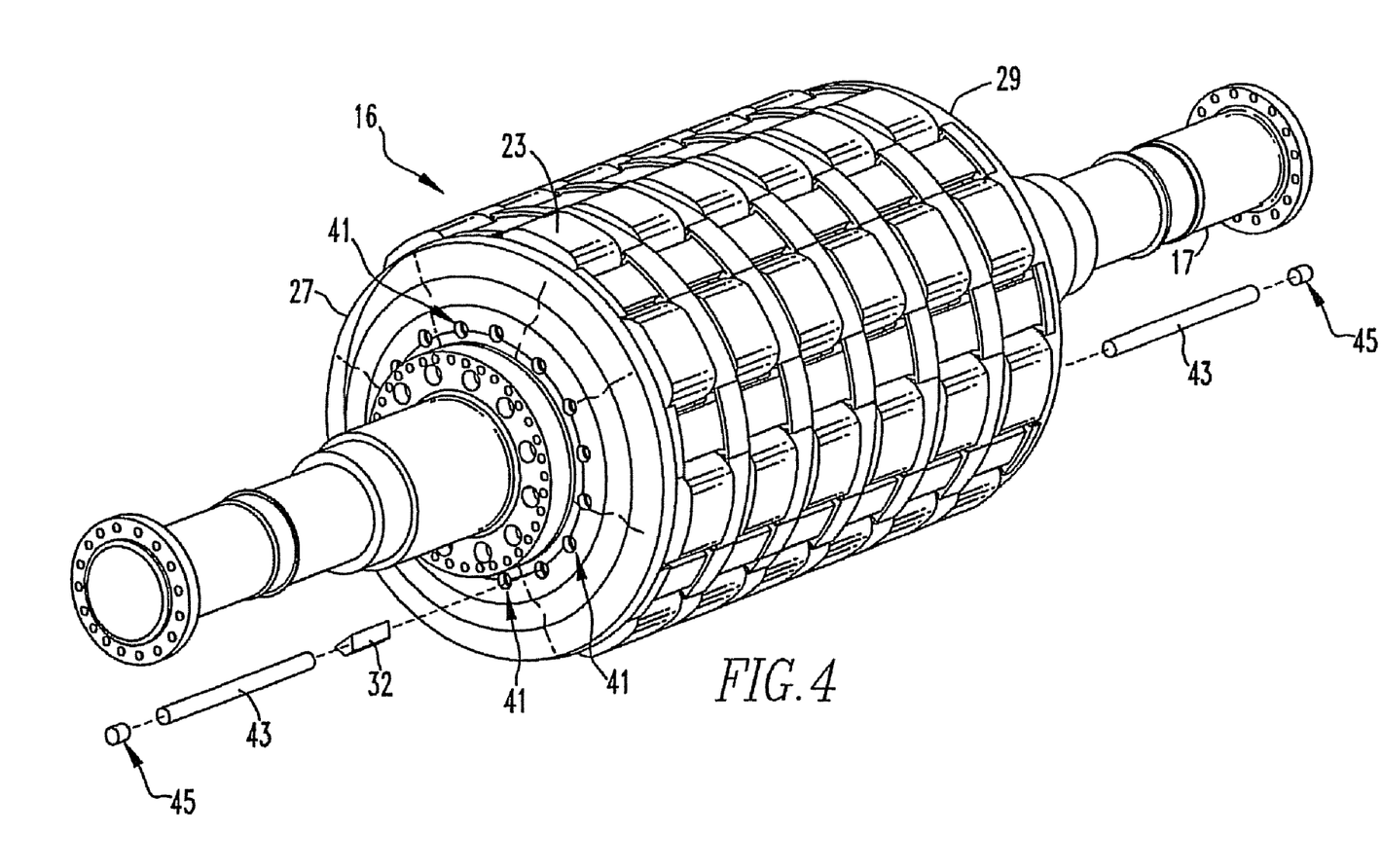
FIG. 4 is a perspective view of a fully assembled, embedded permanent magnet rotor illustrating a balance weight and corresponding locating rods being inserted through a hole in a retainer plate of the rotor.
Figure 5:
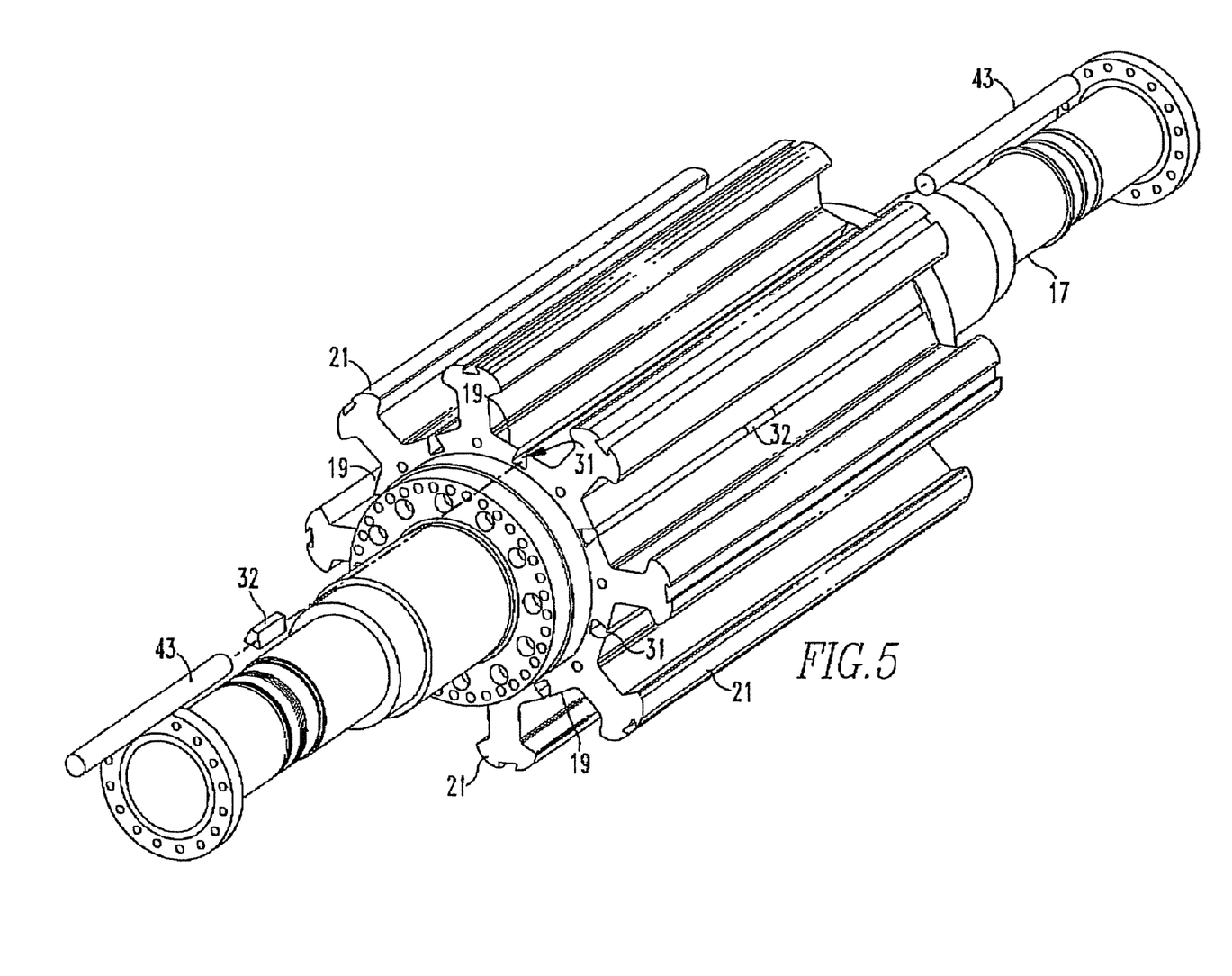
FIG. 5 is a perspective view of a shaft of the permanent magnet rotor of FIG. 2 with a balance weight and corresponding locating rods positioned within an axial slot of the shaft.

With reference to FIGS. 2 through 4, an embedded permanent magnet motor rotor, denoted generally as reference numeral 16 in FIG. 5, includes a shaft 17 with an even number of substantially identical recessed and overhung slots 19. Slots 19 define substantially identical generally T-shaped ribs 21 with dovetail surfaces adjacent slots 19. A plurality of generally C-shaped lamination stacks 23 surrounds T-shaped ribs 21. Lamination stacks 23 are made up of individual sheets positioned perpendicular to the axis of rotation of shaft 17. The sheets have edges that abut the overhung or dovetail surface of the ribs 21. A plurality of non-magnetic cradles (not shown) for holding permanent magnets 25 is positioned in each slot 19. Each cradle carries laminated permanent magnets 25. Retainer plates 27, 29 enclose permanent magnets 25, lamination stacks 23 and the cradles.

The method of the present invention allows for a mid-plane balance correction of motor rotor 16 without disassembling the device by machining an axial slot 31 into a center portion of each of slots 19 prior to assembly of embedded permanent magnet motor rotor 16 and sliding at least one balance weight 32 into at least one of axial slots 31 to a position required to make a mid-plane balance correction.

Accordingly, the method begins by machining an axial slot 31 in a center portion of each slot 19 prior to the assembly of the lamination stack 23 and magnet 25 stages and retainer plates 27, 29 on shaft 17. Each axial slot 31 has a cross-section with a top opening 33, a bottom 35 and two sides 37, 39. Each axial slot 31 is shaped such that top opening 33 has a width that is smaller than a width of bottom 35. Therefore, the cross-section of each axial slot 31 may be trapezoidal in shape with tapered sides narrowing toward top opening 33 as shown in FIG. 3. However, this is not to be construed as limiting the present invention as any cross-sectional shape may be utilized for the shape of axial slots 31 as long as top opening 33 has a width that is smaller than a width of bottom 35. The reason that axial slot 31 is designed to have such a cross-section is to keep balance weights inserted therein from coming out due to centrifugal force during operation of motor rotor 16. Additionally, axial slots 31 must be of sufficient thickness at a top portion thereof to hold balance weights 32 without causing the material used to construct shaft 17 to yield. Axial slots 31 may be machined into the center portion of slots 19 using a fly cutter, endmill or another appropriate tool.

With specific reference to FIG. 4, once the axial slots 31 have been machined, the lamination stack 23 and magnet 25 stages are assembled on shaft 17. Thereafter, access openings 41 are machined into each of retainer plates 27, 29. Retainer plates 27, 29 are positioned on a first end and a second end of the shaft, respectively, to secure the plurality of stages of lamination stacks 23 and magnets 25 therebetween. Access openings 41 are aligned with axial slots 31 such that balance weights 32 can be slid into access openings 41 and then into axial slots 31.

Balance weights 32 have a cross-section shape such that the cross-section is the same shape as the cross-section of axial slots 31 minus necessary clearance to thereby maximize weight per unit of axial length. Accordingly, balance weights 32 may have a substantially trapezoidal cross-section. However, this is not to be construed as limiting the present invention as balance weights 32 may be of any shape as long as they are wider than top opening 33 of axial slot 31 to allow them to remain in axial slot 31 during operation of motor rotor 16. Balance weights 32 are constructed from a heavy, non-magnetic material such as, but not limited to, tungsten.

Locating rods 43 are provided to maintain balance weights 32 in the correct axial position. A locating rod 43 is positioned on each side of balance weight 32 as shown in FIG. 5. Locating rods 43 have a length such that locating rods 43 fill an axial length between balance weight 32 and each of retainer plates 27, 29. Locating rods 43 have a different cross-sectional shape than balance weights 32 and axial slots 31. The cross-sectional shape of locating rods 43 is chosen to minimize added weight and to be more commercially available. Therefore, locating rods 43 may have a substantially round cross-section because such a shape provides a locating rod 43 with a minimum weight for a trapezoidal slot and such rods are easily obtained. Additionally, locating rods 43 are constructed from a light-weight, non-magnetic material such as, but not limited to, aluminum or plastic.

Initially, each of axial slots 31 may be empty or filled to fall length by two or more locating rods 43. Thereafter, a balance machine (not shown) is used to determine the amount of balance correction that is required for motor rotor 16. The balance machine is an at-speed balance machine, such as the balance machine manufactured by Schenck Corporation of Deer Park, N.Y. This machine calculates the balance correction using a least-squares method based on three runs where trial weights are added one run at a time to each of the end planes and one mid-plane balance area. From this information, the amount and location of one or more balance weights 32 is calculated to provide the appropriate balance correction. The amount of balance correction is also used to determine the length or lengths of balance weights 32. A program called CAB690 Control may be utilized to calculate the axial location, as well as radial location of the balance correction.

Once the appropriate balance weights are selected, each balance weight 32 is placed in the appropriate axial slot 31 through access opening 41 in retainer plate 27 and pushed to the desired position by an appropriate locating opening 43. Then, another locating rod 43 of appropriate length is inserted into the opposite side of axial slot 31 through access opening 41 in retainer plate 29. The purpose of locating rods 43 is to hold the heavy balance weights 32 in the correct axial location. After locating rods 43 have been inserted, access openings 41 in retainer plates 27, 29 are sealed with plugs 45 to restrain locating rods 43.

Alternatively to the above described method and with specific reference to FIG. 5, balance weights 32 and locating rods 43 may be inserted into axial slots 31 prior to the assembly of magnet 25 and lamination stack 23 stages and retainer plates 27, 29 onto shaft 17.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that, to the extent possible, one or more features of any embodiment can be combined with one or more features of any other embodiment.

The invention claimed is:

1. A method of balancing an embedded permanent magnet motor rotor, comprising the steps of:
   a) providing a non-magnetic cylindrical shaft having an axis of rotation and a generally cylindrical surface with an even number of recessed slots defining an even number of ribs therebetween;
   b) machining an axial slot having a cross-section with a top opening, a bottom and two sides in a center portion of each of the recessed slots;
   c) sliding at least one balance weight into at least one of the axial slots; and
   d) inserting locating rods into the axial slot on each side of the at least one balance weight.

2. The method of claim 1, wherein the top opening of the axial slot has a width that is smaller than a width of the bottom of the axial slot.

3. The method of claim 1, wherein the axial slot has a substantially trapezoidal cross-section.

4. The method of claim 1, wherein the at least one balance weight has a substantially trapezoidal cross-section.

5. The method of claim 1, wherein the balance weight is constructed from a heavy, non-magnetic material.

6. The method of claim 1, wherein the locating rods have a substantially round cross-section.

7. The method of claim 1, wherein the locating rods are constructed from a light-weight, non-magnetic material.

8. The method of claim 1, wherein after step b) and prior to step c) a plurality of stages of lamination stacks and magnets are positioned around the shaft and two retainer plates with holes machined therein corresponding to a position of each of the axial slots are positioned at a first end and a second end of the shaft, respectively, to secure the plurality of stages therebetween.

9. The method of claim 8, wherein each stage comprises a plurality of lamination stacks surrounding the ribs, and a plurality of permanent magnets circumferentially positioned between the lamination stacks.

10. The method of claim 8, wherein the locating rods have a length such that the locating rods fill an axial length between the balance weight and each of the retainer plates.

11. A permanent magnet rotor assembly comprising:
    a non-magnetic cylindrical shaft having an axis of rotation and a generally cylindrical surface with an even number of recessed slots defining an even number of ribs therebetween, each of the recessed slots having an axial slot positioned in a center portion thereof and extending along a length thereof;
    a plurality of stages of lamination stacks and magnets surrounding the shaft to form an assembly, each stage comprising:
       a plurality of lamination stacks surrounding the ribs, and
       a plurality of permanent magnets circumferentially positioned between the lamination stacks;
    at least one balance weight positioned within each of the axial slots;
    locating rods positioned in the axial slot on each side of the at least one balance weight; and
    disc-shaped retainer plates with holes machined therein corresponding to each of the axial slots at each axial end of the rotor.

12. The permanent magnet rotor assembly of claim 11, wherein the axial slot has a substantially trapezoidal cross-section.

13. The permanent magnet rotor assembly of claim 11, wherein the at least one balance weight has a substantially trapezoidal cross-section.

14. The permanent magnet rotor assembly of claim 11, wherein the balance weight is constructed from a heavy, non-magnetic material.

15. The permanent magnet rotor assembly of claim 11, wherein the locating rods have a substantially round cross-section.

16. The permanent magnet rotor assembly of claim 11, wherein the locating rods are constructed from a light-weight, non-magnetic material.

17. The permanent magnet rotor assembly of claim 11, wherein the locating rods have a length such that the locating rods fill an axial length between the balance weight and each of the retainer plates.

18. The permanent magnet rotor assembly of claim 11, wherein the lamination stacks are generally C-shaped.

19. The permanent magnet rotor assembly of claim 11, wherein the retainer plates are constructed of a high strength, lightweight, non-magnetic material.

20. A method of balancing an embedded permanent magnet motor rotor, comprising the steps of:

a) providing a non-magnetic cylindrical shaft having an axis of rotation and a generally cylindrical surface with an even number of recessed slots defining an even number of ribs therebetween;

b) machining an axial slot having a cross-section with a top opening, a bottom and two sides in a center portion of each of the recessed slots;

c) positioning a plurality of stages of lamination stacks and magnets around the shaft, each of the plurality of stages comprising: a plurality of lamination stacks surrounding the ribs, and a plurality of permanent magnets circumferentially positioned between the lamination stacks;

d) positioning two retainer plates with holes machined therein corresponding to a position of each of the axial slots at a first end and a second end of the shaft, respectively, to secure the plurality of stages therebetween;

e) sliding at least one balance weight into at least one of the holes of one of the retainer plates and then into one of the axial slots; and f) inserting locating rods into the axial slot on each side of the at least one balance weight.

* * * * *